United States Patent
Tsai

(10) Patent No.: US 10,458,570 B2
(45) Date of Patent: Oct. 29, 2019

(54) VALVE DETECTION DEVICE AND OPERATING METHOD THEREOF

(71) Applicant: Aeon Matrix Inc., Taipei (TW)

(72) Inventor: Ming-Je Tsai, Taipei (TW)

(73) Assignee: AEON MATRIX INC., Neihu Dist., Taipei (TW)

( * ) Notice: Subject to any disclaimer, the term of this patent is extended or adjusted under 35 U.S.C. 154(b) by 456 days.

(21) Appl. No.: 15/476,462

(22) Filed: Mar. 31, 2017

(65) Prior Publication Data

US 2017/0282199 A1     Oct. 5, 2017

Related U.S. Application Data

(60) Provisional application No. 62/317,024, filed on Apr. 1, 2016.

(51) Int. Cl.
 *F16K 37/00* (2006.01)
 *F16K 31/06* (2006.01)

(52) U.S. Cl.
 CPC ...... *F16K 37/0041* (2013.01); *F16K 31/0675* (2013.01)

(58) Field of Classification Search
 CPC ............. F16K 31/0675; F16K 37/0041; B05B 12/004
 USPC ......................................................... 361/152
 See application file for complete search history.

(56) References Cited

U.S. PATENT DOCUMENTS

| 6,453,215 B1* | 9/2002 | Lavoie ................ A01G 25/16 137/624.11 |
| 7,784,490 B1* | 8/2010 | Stewart ................ B63B 13/02 137/554 |
| 2012/0106019 A1* | 5/2012 | Buxton ................ H01F 7/1877 361/152 |
| 2014/0238494 A1* | 8/2014 | Schweikert ......... F16K 31/0648 137/1 |
| 2014/0251467 A1* | 9/2014 | Ogawa ................ F16K 37/0041 137/551 |

* cited by examiner

*Primary Examiner* — Kevin J Comber
(74) *Attorney, Agent, or Firm* — Muncy, Geissler, Olds & Lowe, P.C.

(57) ABSTRACT

A valve operating method for a sprinkler system with a plurality of electrical valves is disclosed. The method includes the following steps: receiving a user generated query signal; generating a first set of the control signals to a driving circuit of the plurality of electrical valves of the sprinkler system in response to the query signal; generating a detection signal successive to the first set of the control signals; orderly sending the detection signal to the plurality of solenoid valves; and sensing a voltage level of a sensing terminal of the driving circuit, and obtaining a sensing result accordingly. A first sub-circuit of the driving circuit is disabled in response to the first set of the control signals. The valve control device include electronic parts to implement the above-mentioned steps is also disclosed.

18 Claims, 4 Drawing Sheets

VALVE DETECTION DEVICE AND OPERATING METHOD THEREOF

CROSS REFERENCE TO RELATED APPLICATIONS

This Non-provisional application claims priority to U.S. provisional patent application with Ser. No. 62/317,024 filed on Apr. 1, 2016, the entire contents of which are hereby incorporated by reference.

BACKGROUND

Technical Field

This invention relates to a valve detection and driving method and valve control device, more particularly to a method and device for detecting the existence of a solenoid valve and driving the solenoid valve accordingly.

Related Art

Permanently installed watering systems typically include a number of lawn sprinklers, with several water conduits feeding water to one or more sprinklers in the zones. The conduits generally are installed underground, and feed the sprinklers in different zones. Each sprinkler connects to one of the conduits via a valve. When the valve is open, water from the conduits is feed to the corresponding sprinkler. A traditional sprinkler control system supplies electrical power to a solenoid valve of the corresponding sprinkler in order to open/close the solenoid valve, and thus provides/suspends water to the sprinklers.

In order for the sprinkler system to control each solenoid valve, it first need to learn which sprinklers are in connection with the solenoid valves and which ones are not. However, if there is a change, e.g. installation/uninstallation, of a new solenoid valve, the sprinkler system will need to update its knowledge about it in order to modify its control to the corresponding solenoid valve accordingly.

There is therefore a need to provide a method and device for valve detection of a sprinkler system.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

In one aspect of the present invention, embodiments are provided that an operating method of a valve control device. The valve control device has a driving circuit and the driving circuit comprises a plurality of solenoid valve terminals and a sensing terminal. The operating method includes the following steps: sending a first set of the control signals to the driving circuit; sending a detection signal; sensing a voltage level at the sensing terminal when the detection signal is sent to one of the solenoid valve terminals and obtaining a sensing result accordingly; and repeating the step of sensing the voltage level until all the sensing results of the corresponding solenoid valve terminals are obtained. A first sub-circuit of the driving circuit is disabled in response to the first set of the control signals.

In one embodiment, the operating method further includes a step of: sending a second set of the control signals to the driving circuit. A second sub-circuit of the driving circuit is disabled in response to the second set of the control signals.

In one embodiment, the operating method further includes steps of: selectively sending a driving signal to one of the plurality of solenoid valve terminals according to the corresponding sensing result; and repeating the step of sending the driving signal until all the sensing results are processed.

In one embodiment, the first sub-circuit of the driving circuit and the second sub-circuit of the driving circuit are mutually exclusive.

In one embodiment, the first sub-circuit of the driving circuit and the second sub-circuit of the driving circuit are circuitry-wise identical.

In one embodiment, the first sub-circuit of the driving circuit and the second sub-circuit of the driving circuit are two H-bridge circuits.

In another aspect of the present invention, embodiments are provided that a valve control device for a sprinkler system with a plurality of solenoid valves includes a microprocessor, a driving circuit, and a microcontroller unit. The driving circuit includes a plurality of solenoid valve terminals, a sensing terminal, a switch, a first sub-circuit, and a second sub-circuit. The solenoid valve terminals are configured to connect with the solenoid valves. The switch has at least one input terminal and a plurality of output terminals which are electronically coupled to the plurality of solenoid valve terminals, respectively. The first sub-circuit is electronically coupled to the at least one input terminal of the switch. The second sub-circuit is electronically coupled to the at least one input terminal of the switch. The switch connects one of the at least one input terminal with one of the plurality of output terminals according to a switch signal. The microcontroller unit is electronically coupled to the driving circuit, sends a first set of the control signals to the driving circuit and sends a detection signal. The microprocessor is electronically coupled to the driving circuit and the microcontroller unit, and repeatedly senses a voltage level at the sensing terminal when the detection signal is sent to one of the solenoid valve terminal and obtains a sensing result accordingly until all the sensing results of the corresponding solenoid valve terminals are obtained. The microprocessor also sends the switch signal to the switch. The first sub-circuit of the driving circuit is disabled in response to the first set of the control signals.

In one embodiment, the microcontroller unit sends a second set of the control signals to the driving circuit, and the second sub-circuit of the driving circuit is disabled in response to the second set of the control signals.

In one embodiment, the microcontroller unit sends a driving signal to the driving circuit, the microprocessor sends the switch signal to the switch according to the sensing results, and the driving circuit selectively relays the driving signal to one of the plurality of solenoid valve terminals according to the switch signal.

In one embodiment, the first sub-circuit of the driving circuit and the second sub-circuit of the driving circuit are mutually exclusive.

In one embodiment, the first sub-circuit of the driving circuit and the second sub-circuit of the driving circuit are circuitry-wise identical.

In one embodiment, the first sub-circuit of the driving circuit and the second sub-circuit of the driving circuit are two H-bridge circuits.

In yet another aspect of the present invention, embodiments are provided that a non-transitory computer-readable storage medium storing a program causing a valve control device to perform an operation for a valve control process.

The valve control device comprises a driving circuit and the driving circuit comprises a plurality of solenoid valve terminals and a sensing terminal. The valve control process includes the following steps of: sending a first set of the control signals to the driving circuit; sending a detection signal; sensing a voltage level at the sensing terminal when the detection signal is sent to one of the solenoid valve terminals and obtaining a sensing result accordingly; and repeating the step of sensing the voltage level until all the sensing results of the corresponding solenoid valve terminals are obtained. A first sub-circuit of the driving circuit is disabled in response to the first set of the control signals.

In one embodiment, the valve control process further includes a step of: sending a second set of the control signals to the driving circuit. A second sub-circuit of the driving circuit is disabled in response to the second set of the control signals.

In one embodiment, the valve control process further includes steps: selectively sending a driving signal to one of the plurality of solenoid valve terminals according to the corresponding sensing result; and repeating the step of sending the driving signal until all the sensing results are processed.

In one embodiment, the first sub-circuit of the driving circuit and the second sub-circuit of the driving circuit are mutually exclusive.

In one embodiment, the first sub-circuit of the driving circuit and the second sub-circuit of the driving circuit are circuitry-wise identical.

In one embodiment, the first sub-circuit of the driving circuit and the second sub-circuit of the driving circuit are two H-bridge circuits.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a valve control device 10, which is used with a sprinkler system 1. In the embodiment, the sprinkler system 1 has a plurality of solenoid valves V1~Vn, a plurality of water outlets O1~On and at least one conduit C. The solenoid valves V1~Vn are connected to the water outlets O1~On, respectively. The solenoid valves V1~Vn also connected to the conduit C such that the water inflow of each of the water outlets O1~On from the conduit C can be controlled by the solenoid valves V1~Vn, respectively. Please note that, the sprinkler system 1 described herein is for illustrative purpose only and not meant to be a limitation of the present invention.

Figure 1:
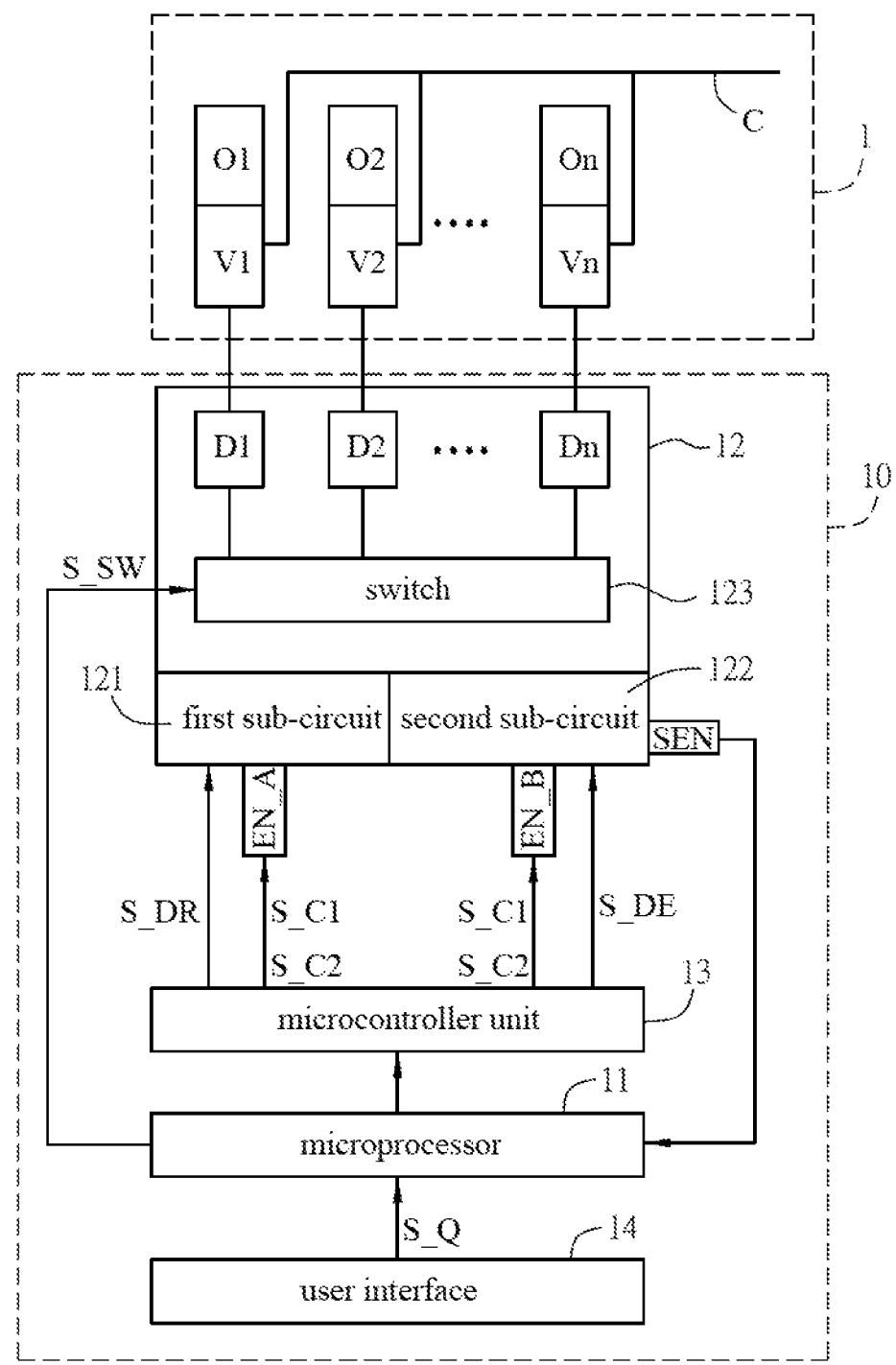
FIG. 1 is a functional block diagram illustrating a valve control device for a sprinkler system according to an embodiment of the present invention.

Please refer to FIG. 1, which is a functional block diagram of the valve control device 10 according to an embodiment of the present invention. The valve control device 10 includes a microprocessor 11, a driving circuit 12, a microcontroller unit 13, a user interface 14. The driving circuit 12 has a first sub-circuit 121, a second sub-circuit 122, a sensing terminal SEN, an enable terminal EN_A, an enable terminal EN_B, a switch 123, and a plurality of solenoid valve terminals D1~Dn. The switch 123 has two input terminals and a plurality of output terminals which are electronically coupled to the plurality of solenoid valve terminals, respectively. The switch 123 connects one of the input terminals with one of the output terminals according to a switch signal S_SW issued by the microprocessor 11. The first sub-circuit 121 and the second sub-circuit 122 are electronically coupled to each one of the input terminals of the switch 123, respectively. In the embodiment, the first sub-circuit 121 and the second sub-circuit 122 are two identical H-bridge circuits, which function mutually exclusively. The driving circuit 12 is electronically coupled to the microprocessor 11. The microcontroller unit 13 is electronically coupled to the microprocessor 11 and the driving circuit 12. The solenoid valve terminals D1~Dn are arranged for connecting to the solenoid valves V1~Vn, respectively. The valve control device 10 is arranged to operate in two different modes, a driving mode and a detection mode.

When the valve control device 10 operates in the detection mode, the microprocessor 11 is arranged for receiving a query signal S_Q from the user interface 14, or from a sever which the microprocessor 11 is in communications with. The word "server" is used herein to mean "a computer that runs a program which provides services to other computer programs." Any implementation described herein as "server" is not necessarily to be construed as preferred or advantageous over other implementations. In response to the query signal S_Q, the microprocessor 11 triggers the microcontroller unit 13 to generate a first set of the control signals S_C1 and then send the first set of the control signals S_C1 to the driving circuit 12. The driving circuit 12 receives the first set of the control signals S_C1 via the enable terminals EN_A and EN_B. In the embodiment, the first set of the control signals S_C1 includes an enable signal and a disable signal. When the driving circuit 12 receives an enable signal via enable terminal EN_A, the first sub-circuit 121 is enabled, and vice versa. When the driving circuit 12 receives an enable signal via enable terminal EN_B, the second sub-circuit 122 is enabled, and vice versa. The enable signal of the first set of the control signals S_C1 is sent to the driving circuit 12 via the enable terminal EN_B, and the disable signal of the first set of the control signals S_C1 is sent to the driving circuit 12 via the enable terminal EN_A. In this way, when received, the first sub-circuit 121 is disabled, and the second sub-circuit 122 is enabled. The microcontroller unit 13 is also triggered to generate a detection signal S_DE successive to the first set of the control signals S_C1 and then sends the detection signal S_DE to the driving circuit 12. The driving circuit 12 receives the detection signal S_DE and one-by-one relays the detection signal S_DE to each of the solenoid valve terminals D1~Dn according to the switch signal S_SW. In a preferable embodiment, the detection signal S_DE is a continuous direct current (DC) signal with amplitude rages from 5V~15V.

For each solenoid valve terminals that connects to a solenoid valve, it creates a closed loop for the driving circuit 12. Therefore, when a solenoid valve terminal receives the detection signal S_DE, a current can flow back to the second sub-circuit 122 and thus cause the voltage level at the sensing terminal SEN to rise. In this way, by sensing the voltage level at the sensing terminal SEN when the solenoid valve terminal receives the detection signal S_DE, the microprocessor 11 can tell which solenoid valve terminal is connected to a solenoid valve and which is not. After the microprocessor 11 records a sensing result for the corresponding solenoid valve terminal (i.e., the solenoid valve terminal that currently electronically coupled to the driving circuit 12 through the switch 123), the microprocessor 11 issues a new switch signal to the switch 123 such that the next solenoid valve terminal receives the detection signal S_DE. The microprocessor 11 repeats this process until all the sensing results of the solenoid valve terminals D1~Dn are obtained.

When the valve control device 10 operates in the driving mode, the microcontroller unit 13 generates a second set of the control signals S_C2 to the driving circuit 12. In the embodiment, the second set of the control signals S_C2 also includes an enable signal and a disable signal. The enable signal of the second set of the control signals S_C2 is sent to the driving circuit 12 via the enable terminal EN_A, and the disable signal of the second set of the control signals S_C2 is sent to the driving circuit 12 via the enable terminal EN_B. When the driving circuit 12 receives the second set of the control signals S_C2, the first sub-circuit 121 of the driving circuit 12 is enabled, and the second sub-circuit 122 of the driving circuit 12 is disabled. The microcontroller unit 13 also generates a driving signal S_DR successive to the second set of the control signals S_C2 and sends the driving signal S_DR to the driving circuit 12. In a preferable embodiment, the driving signal S_DR is a continuous alternative current (AC) signal with amplitude rages from 20V~25V. The driving circuit 12 selectively relays the driving signal S_DR to the solenoid valve terminals D1~Dn according to the switch signal S_SW issued by the microprocessor 11. When the valve control device 10 operates in the driving mode, the microprocessor 11 issues the switch signal S_SW according to the sensing results previously obtained in the detection mode. In other words, only the solenoid valve terminals which are detected to be connected with a solenoid valve will receive the driving signal S_DR. In the preferable embodiment, since the driving signal S_DR is an AC signal, the solenoid valves V1~Vn will open and then close, repeatedly. This will cause the water outlets O1~On to sprinkle intermittently.

Figure 2:
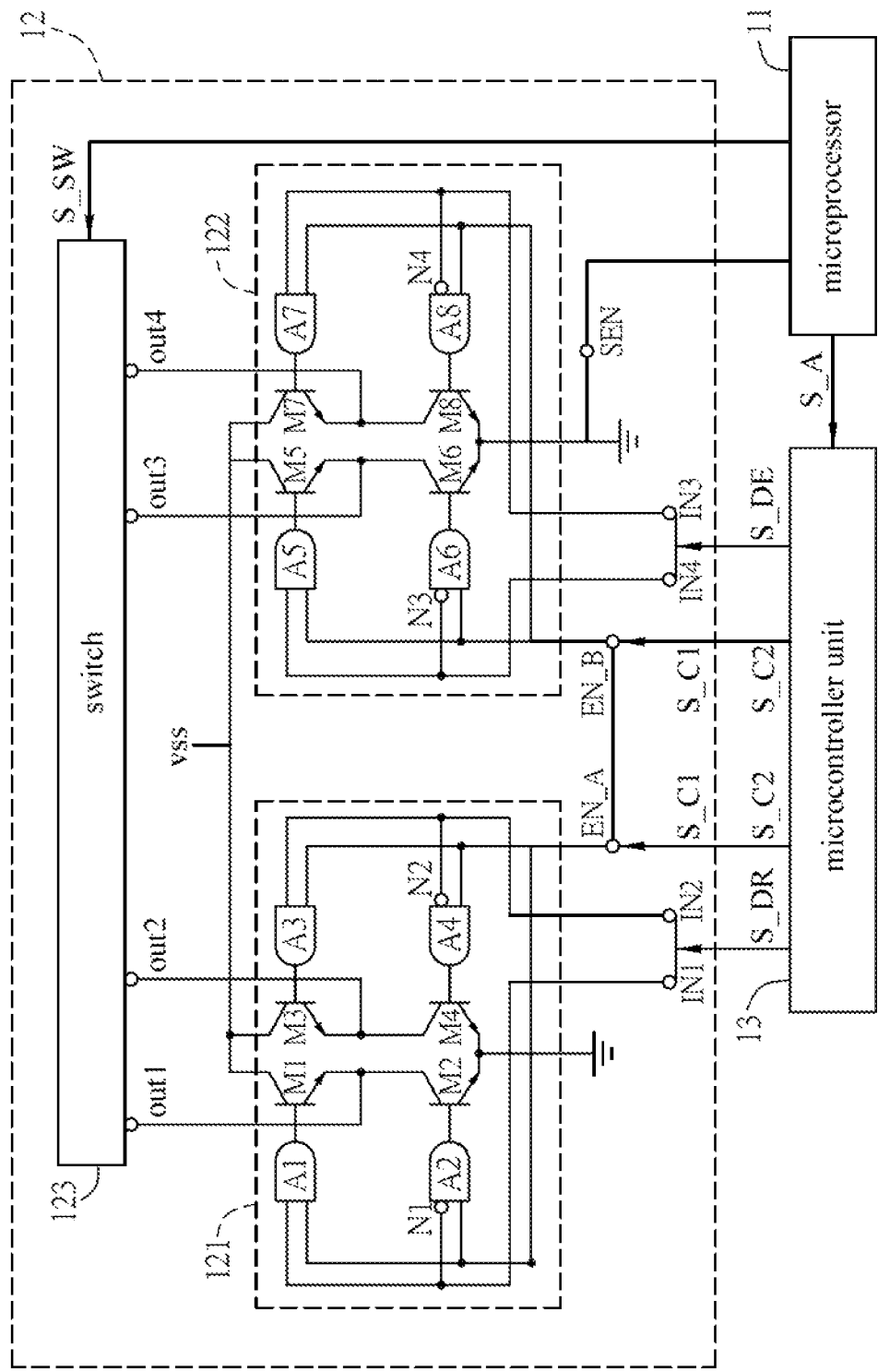
FIG. 2 is a circuit diagram of the first sub-circuit and the second sub-circuit in conjunction with other functional blocks according to the embodiment of the present invention.

In detail, please refer to FIG. 2, which illustrates a circuit diagram of the first sub-circuit 121 and the second sub-circuit 122 in conjunction with other functional blocks according to the embodiment of the present invention. As can be seen from FIG. 2, the first sub-circuit 121 is substantially an H-bridge circuit that comprises 4 transistors M1~M4, 4 AND gates A1~A4, 2 NOT gates N1 and N2, 2 input terminals IN1 and IN2, 2 output terminals OUT1 and OUT2, and an enable terminal EN_A. The second sub-circuit 122 is also substantially an H-bridge circuit that comprises 4 transistors M5~M8, 2 input terminals IN3 and IN4, 2 output terminals OUT3 and OUT4, the sensing terminal SEN, and an enable terminal EN_B.

The emitter of the transistor M1 is connected to the collector of the transistor M2 and the output terminal OUT1, and the emitter of transistor M3 is connected to the collector of the transistor M4 and the output terminal OUT2. The base of the transistor M1 is connected to the output of the AND gate A1, the base of the transistor M2 is connected to the output of the AND gate A2, the base of the transistor M3 is connected to the output of the AND gate A3, and the base of the transistor M4 is connected to the output of the AND gate A4. One input of the AND gate A1 is connected to the input terminal IN1, and the other input of the AND gate A1 is connected to the enable terminal EN_A. One input of the AND gate A2 is connected to the input terminal IN1 via the NOT gate N1, and the input output of the AND gate A2 is connected to the enable terminal EN_A. One input of the AND gate A3 is connected to the input terminal IN2, and the other input of the AND gate A3 is connected to the enable terminal EN_A. One input of the AND gate A4 is connected to the input terminal IN2 via the NOT gate N2, and the other input of the AND gate A4 is connected to the enable terminal EN_A.

The emitter of the transistor M5 is connected to the collector of the transistor M6 and the output terminal OUT3, and the emitter of transistor M7 is connected to the collector of the transistor M8 and the output terminal OUT4. The base of the transistor M5 is connected to the output of the AND gate A5, the base of the transistor M6 is connected to the output of the AND gate A6, the base of the transistor M7 is connected to the output of the AND gate A7, and the base of the transistor M8 is connected to the output of the AND gate A8. One input of the AND gate A5 is connected to the input terminal IN3, and the other input of the AND gate A5 is connected to the enable terminal EN_B. One input of the AND gate A6 is connected to the input terminal IN3 via the NOT gate N3, and the other input of the AND gate A6 is connected to the enable terminal EN_B. One input of the AND gate A7 is connected to the input terminal IN4, and the other input of the AND gate A7 is connected to the enable terminal EN_B. One input of the AND gate A8 is connected to the input terminal IN4 via the NOT gate N4, and the other input of the AND gate A8 is connected to the enable terminal EN_B.

The first set of the control signals S_C1 is sent to the driving circuit 12 via the enable terminal EN_A and the enable terminal EN_B. When the valve control device 10 operates in the detection mode, the microcontroller unit 13 generates the first set of the control signals S_C1 such that the enable terminal EN_A receives the disable signal while the enable terminal EN_B receives the enable signal. The disable signal received by the enable terminal EN_A will be inputs of the AND gates A1~A4, which yields the low voltage outputs of all 4 AND gates A1~A4, and thereby switching off the transistors M1~M4. The first sub-circuit 121 is therefore disabled. On the other hand, the enable signal received by the enable terminal EN_B will be inputs of the AND gates A5~A8, in addition to the detection signal S_DE received by the driving circuit 12 via input terminals IN3~IN4 as the inputs of the AND gates A5~A8, the AND gates A5~A8 yields the high voltage outputs of AND gates A5 and A7, and low voltage outputs of AND gates A6 and A8. The transistors M5 and M7 is thereby switched on, and the second sub-circuit 122 is enabled.

The second set of the control signals S_C2 is also sent to the driving circuit 12 via the enable terminal EN_A and the enable terminal EN_B. When the valve control device 10 operates in the driving mode, the microcontroller unit 13 generates the second set of the control signals S_C2 such that the enable terminal EN_A receives the enable signal while the enable terminal EN_B receives the disable signal. The disable signal received by the enable terminal EN_B will be inputs of the AND gates A5~A8, which yields the low voltage outputs of all 4 AND gates A5~A8, and thereby switching off the transistors M5~M8. The second sub-circuit 122 is therefore disabled. On the other hand, the enable signal received by the enable terminal EN_A will be inputs of the AND gates A1~A4, in addition to the driving signal S_DR received by the driving circuit 12 via input terminals IN1~IN2 as the inputs of the AND gates A1~A4, the AND gates A1~A4 yields the high voltage outputs of AND gates A1 and A3, and low voltage outputs of AND gates A2 and A4. The transistors M1 and M3 is thereby switched on, and the first sub-circuit 121 is enabled.

The switch 123 is controlled by the switch signal S_SW issued by the microprocessor 11 such that the detection signal S_DE is orderly sent to the solenoid valve terminals D1~Dn one by one. In addition, the switch 123 is also controlled by the microprocessor 11 to ensure the driving signal S_DR is sent to the active solenoid valves according to the detection result.

In the embodiment, the driving circuit 12 may further include an LC filter (not shown) coupled between the output terminals OUT1 and OUT2 such that the driving signal S_DR, namely the AC current signal, will be converted into a sinusoid wave prior to being feed into the solenoid valves V1~Vn. The converted sinusoid-wave will yield smoother control of the solenoid valves V1~Vn. However, it is for illustrative purpose only and not meant to be a limitation of the present invention.

Figure 3A:
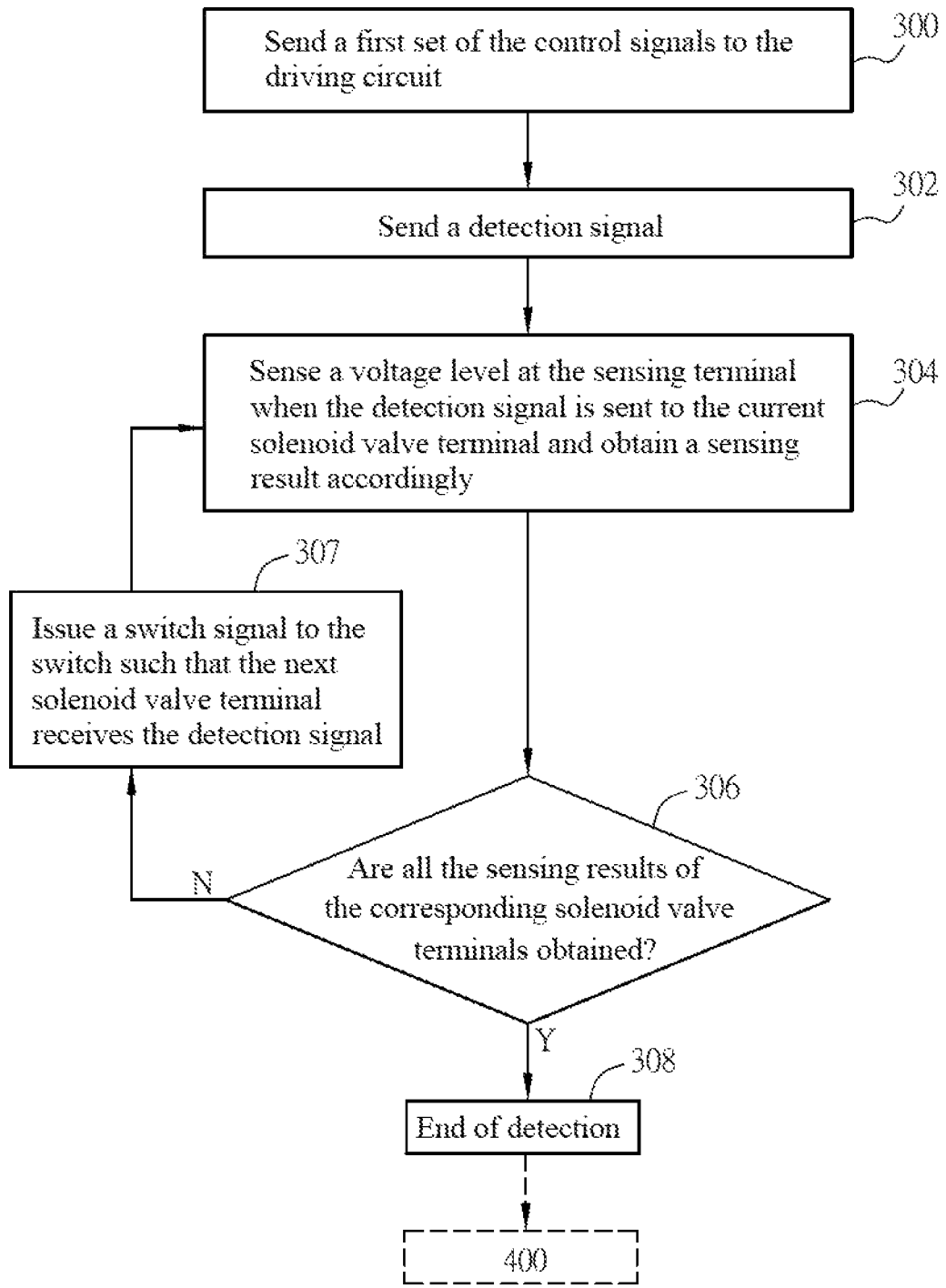
FIGS. 3A and 3B are flowcharts illustrating operations of an operating method of a valve control device for a sprinkler system according to another embodiment of the present invention.
Figure 3B:
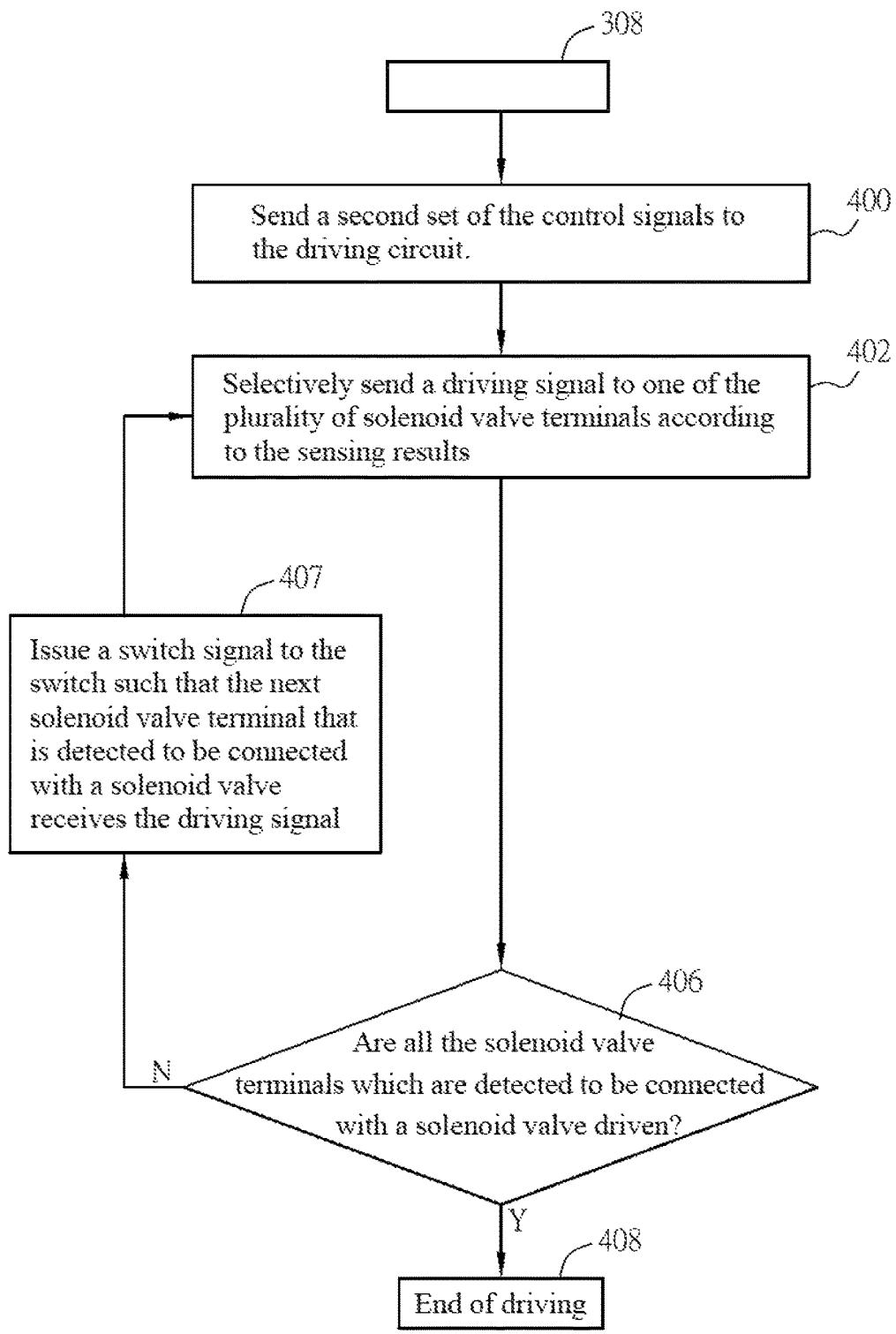

Please refer to FIGS. 3A and 3B, which are flowcharts illustrating steps of an operating method of the valve control device 10 for the sprinkler system 1 according to an embodiment of the present invention. Provided that the result is substantially the same, the steps are not required to be executed in the exact order shown in FIGS. 3A and 3B. The exemplary valve operating method may be briefly summarized by following steps.

Step 300: Send a first set of the control signals to the driving circuit.

Step 302: Send a detection signal.

Step 304: Sense a voltage level at the sensing terminal when the detection signal is sent to the current solenoid valve terminal and obtain a sensing result accordingly.

Step 306: Are all the sensing results of the solenoid valve terminals obtained? If "No", go to Step 307, otherwise go to Step 308.

Step 307: Issue a switch signal to the switch such that the next solenoid valve terminal receives the detection signal. Then, go to Step 304.

Step 308: End of detection.

Step 400: Send a second set of the control signals to the driving circuit.

Step 402: Selectively send a driving signal to one of the plurality (or, to the solenoid valve terminal that currently electronically coupled to the driving circuit 12 through the switch 123) of solenoid valve terminals according to the sensing results.

Step 406: Are all the solenoid valve terminals which are detected to be connected with a solenoid valve driven? If "No", go to Step 407, otherwise go to Step 408.

Step 407: Issue a switch signal to the switch such that the next solenoid valve terminal that is detected to be connected with a solenoid valve receives the driving signal. Then, go to Step 402.

Step 408: End of driving.

Step 300 and Step 400 may be achieved by the microprocessor 11. The microprocessor 11 then triggers the microcontroller unit 13 to execute Step 302 and Step 402. Step 304, 306, 307, 406, and 407 are also performed by microprocessor 11. As a person skilled in the art can readily understand the operation of each step shown in FIGS. 3A, 3B and FIG. 4 from the above-mentioned paragraphs, and further description is omitted here for brevity.

In general, the routines executed to implement the embodiments of the disclosure may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the invention should not be limited to use solely in any specific application identified and/or implied by such nomenclature.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to and from the Internet and other networks. Such communications media, when carrying computer-readable instructions that direct the functions of the present invention, are embodiments of the present invention. Broadly, computer-readable storage media and communications media may be referred to herein as computer-readable media.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An operating method of a valve control device, wherein the valve control device comprises a driving circuit and the driving circuit comprises a plurality of solenoid valve terminals and a sensing terminal, said operating method comprising:
   sending a first set of the control signals to the driving circuit;
   sending a detection signal;
   sensing a voltage level at the sensing terminal when the detection signal is sent to one of the solenoid valve terminals and obtaining a sensing result accordingly; and
   repeating the step of sensing the voltage level until all the sensing results of the solenoid valve terminals are obtained,
   wherein a first sub-circuit of the driving circuit is disabled in response to the first set of the control signals.

2. The operating method of claim 1, further comprising a step of:
   sending a second set of the control signals to the driving circuit;
   wherein a second sub-circuit of the driving circuit is disabled in response to the second set of the control signals.

3. The operating method of claim 2, further comprising steps of:
   selectively sending a driving signal to one of the plurality of solenoid valve terminals according to the sensing results; and
   repeating the step of sending the driving signal until all the sensing results are processed.

4. The operating method of claim 2, wherein the first sub-circuit of the driving circuit and the second sub-circuit of the driving circuit are mutually exclusive.

5. The operating method of claim 4, wherein the first sub-circuit of the driving circuit and the second sub-circuit of the driving circuit are circuitry-wise identical.

6. The operating method of claim 4, wherein the first sub-circuit of the driving circuit and the second sub-circuit of the driving circuit are two H-bridge circuits.

7. A valve control device, comprising:
   a driving circuit, comprising:
      a plurality of solenoid valve terminals which are configured to connect to a plurality of solenoid valves;
      a sensing terminal;
      a switch having at least one input terminal and a plurality of output terminals which are electronically coupled to the plurality of solenoid valve terminals, respectively, wherein the switch connects the at least one input terminal with one of the plurality of output terminals according to a switch signal;
      a first sub-circuit electronically coupled to the at least one input terminal of the switch; and
      a second sub-circuit electronically coupled to the at least one input terminal of the switch;
   a microcontroller unit electronically coupled to the driving circuit, sending a first set of the control signals to the driving circuit and sending a detection signal; and
   a microprocessor electronically coupled to the driving circuit and the microcontroller unit, repeatedly sensing a voltage level at the sensing terminal when the detection signal is sent to one of the solenoid valve terminals and obtaining a sensing result accordingly until all the sensing results of the solenoid valve terminals are obtained, and sending the switch signal to the switch,
   wherein the first sub-circuit is disabled in response to the first set of the control signals.

8. The valve control device of claim 7, wherein the microcontroller unit sends a second set of the control signals to the driving circuit, and the second sub-circuit of the driving circuit is disabled in response to the second set of the control signals.

9. The valve control device of claim 8, wherein the microcontroller unit sends a driving signal to the driving circuit, the microprocessor sends the switch signal to the switch according to the sensing results, and the driving circuit selectively relays the driving signal to one of the plurality of solenoid valve terminals according to the switch signal.

10. The valve control device of claim 8, the first sub-circuit of the driving circuit and the second sub-circuit of the driving circuit are mutually exclusive.

11. The valve control device of claim 10, wherein the first sub-circuit of the driving circuit and the second sub-circuit of the driving circuit are circuitry-wise identical.

12. The valve control device of claim 10, wherein the first sub-circuit of the driving circuit and the second sub-circuit of the driving circuit are two H-bridge circuits.

13. A non-transitory computer-readable storage medium storing a program, causing a valve control device to perform a valve control process, wherein the valve control device comprises a driving circuit and the driving circuit comprises a plurality of solenoid valve terminals and a sensing terminal, said valve control process comprising:
   sending a first set of the control signals to the driving circuit;
   sending a detection signal;
   sensing a voltage level at the sensing terminal when the detection signal is sent to one of the solenoid valve terminals and obtaining a sensing result accordingly; and
   repeating the step of sensing the voltage level until all the sensing results of the solenoid valve terminals are obtained,
   wherein a first sub-circuit of the driving circuit is disabled in response to the first set of the control signals.

14. The non-transitory computer-readable storage medium of claim 13, wherein the valve control process further comprises a step of:
   sending a second set of the control signals to the driving circuit;
   wherein a second sub-circuit of the driving circuit is disabled in response to the second set of the control signals.

15. The non-transitory computer-readable storage medium of claim 14, wherein the valve control process further comprises steps of:
   selectively sending a driving signal to one of the plurality of solenoid valve terminals according to the corresponding sensing result; and
   repeating the step of sending the driving signal until all the sensing results are processed.

16. The non-transitory computer-readable storage medium of claim 14, wherein the first sub-circuit of the driving circuit and the second sub-circuit of the driving circuit are mutually exclusive.

17. The non-transitory computer-readable storage medium of claim 16, wherein the first sub-circuit of the driving circuit and the second sub-circuit of the driving circuit are circuitry-wise identical.

18. The non-transitory computer-readable storage medium of claim 16, wherein the first sub-circuit of the driving circuit and the second sub-circuit of the driving circuit are two H-bridge circuits.

\* \* \* \* \*